United States Patent [19]

Lampl et al.

[11] Patent Number: 5,714,180
[45] Date of Patent: Feb. 3, 1998

[54] DOUBLE CLOSING UNIT FOR AN INJECTION MOULDING MACHINE

[75] Inventors: Alfred Lampl; Peter Neumann, both of Schwertberg, Austria

[73] Assignee: Engel Maschinebau Gesellschift m.b.H., Schwertberg, Austria

[21] Appl. No.: 578,605

[22] PCT Filed: Sep. 23, 1994

[86] PCT No.: PCT/AT94/00136

§ 371 Date: Jan. 5, 1996

§ 102(e) Date: Jan. 5, 1996

[87] PCT Pub. No.: WO95/08428

PCT Pub. Date: Mar. 30, 1995

[30] Foreign Application Priority Data

Sep. 24, 1993 [AT] Austria ........................ 1926/93
Oct. 13, 1993 [AT] Austria ........................ 2051/93

[51] Int. Cl.[6] ........................................ B29C 45/67
[52] U.S. Cl. ............................... 425/589; 425/595
[58] Field of Search ............................ 425/589, 595

[56] References Cited

U.S. PATENT DOCUMENTS 5,145,353 9/1992 Zakich ........................ 425/588
5,538,415 7/1996 Reinhart et al. .............. 425/593

FOREIGN PATENT DOCUMENTS

| | | |
|---|---|---|
| 1304803 | 8/1962 | France . |
| 7442446 | 7/1976 | France . |
| 893581 | 10/1953 | Germany . |
| 1282906 | 11/1968 | Germany . |
| 2038678 | 2/1972 | Germany . |
| 3300652 | 7/1984 | Germany . |
| 3544155 | 7/1987 | Germany . |
| 1113047 | 5/1968 | Japan . |
| 58-183231 | 10/1983 | Japan . |
| 58-205743 | 11/1983 | Japan . |
| 62-236717 | 10/1987 | Japan . |

Primary Examiner—Tim Heitbrink
Attorney, Agent, or Firm—Notaro & Michalos P.C.

[57] ABSTRACT

Double closing unit of an injection molding machine has a pair of movable mold mounting plates and a stationary mold mounting plate having a pair of stationary mold faces, aligned between the pair of movable mold mounting plates. Two pairs of bar members and a pair of locking units are provided so that each locking unit couples one of the pair of movable mold mounting plates to one of the pairs of bar members. A pair of pressure cushion systems located in the stationary mold mounting plate are each connected to one of the pair of movable mold mounting plates, the pair of pressure cushion systems being independent of each other. At least one pair of fast-motion cylinders is also provided, at least one cylinder being connected between each movable mold mounting plate and the stationary mold mounting plate. The cylinders hold one of the movable mold mounting plates in a closed position when the other movable mold mounting plate is in an open position.

8 Claims, 9 Drawing Sheets

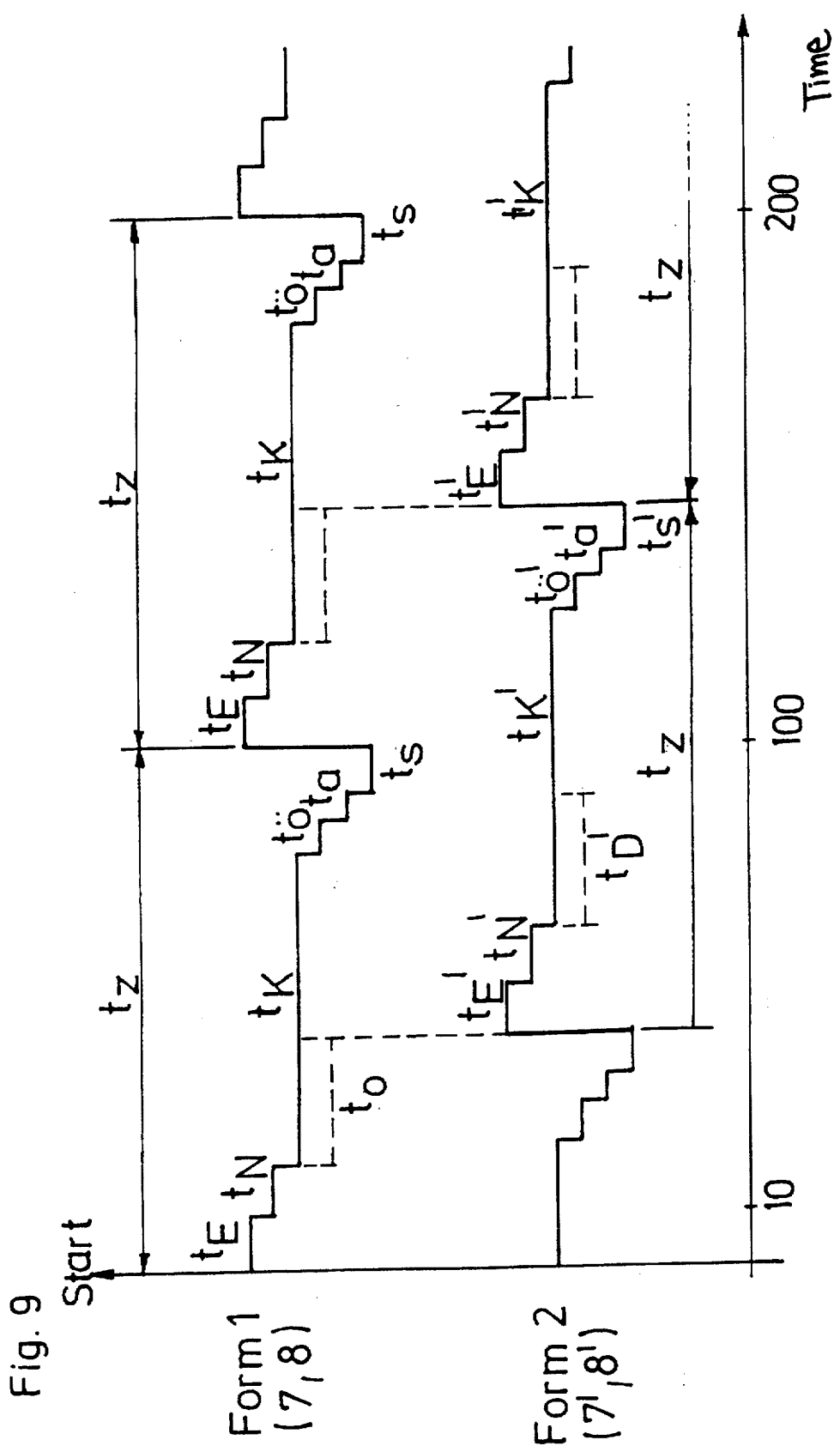

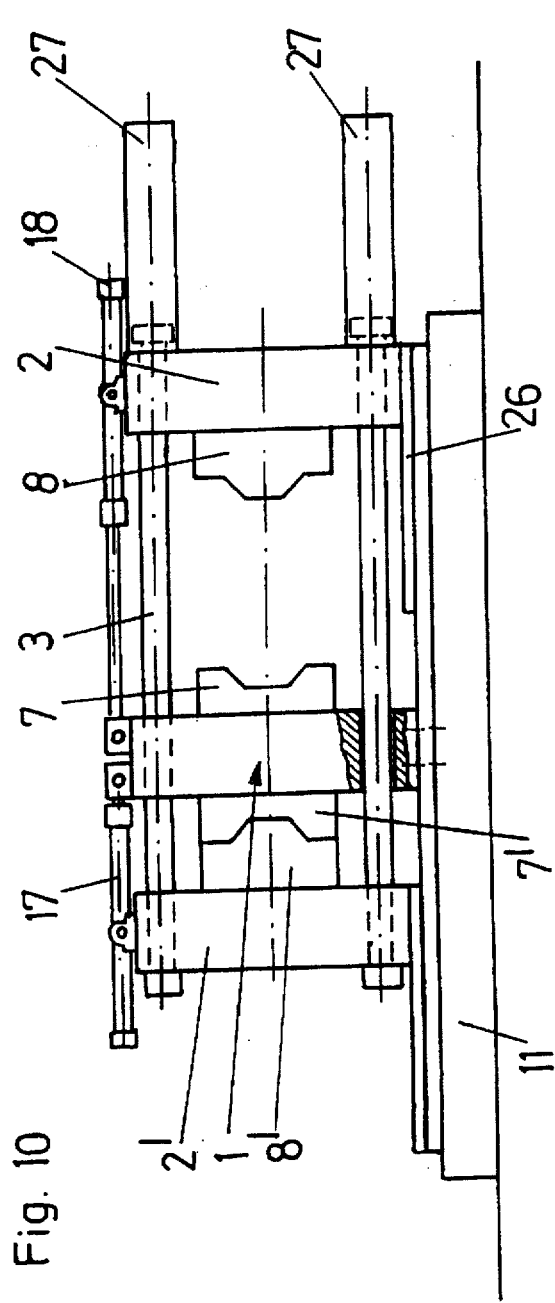
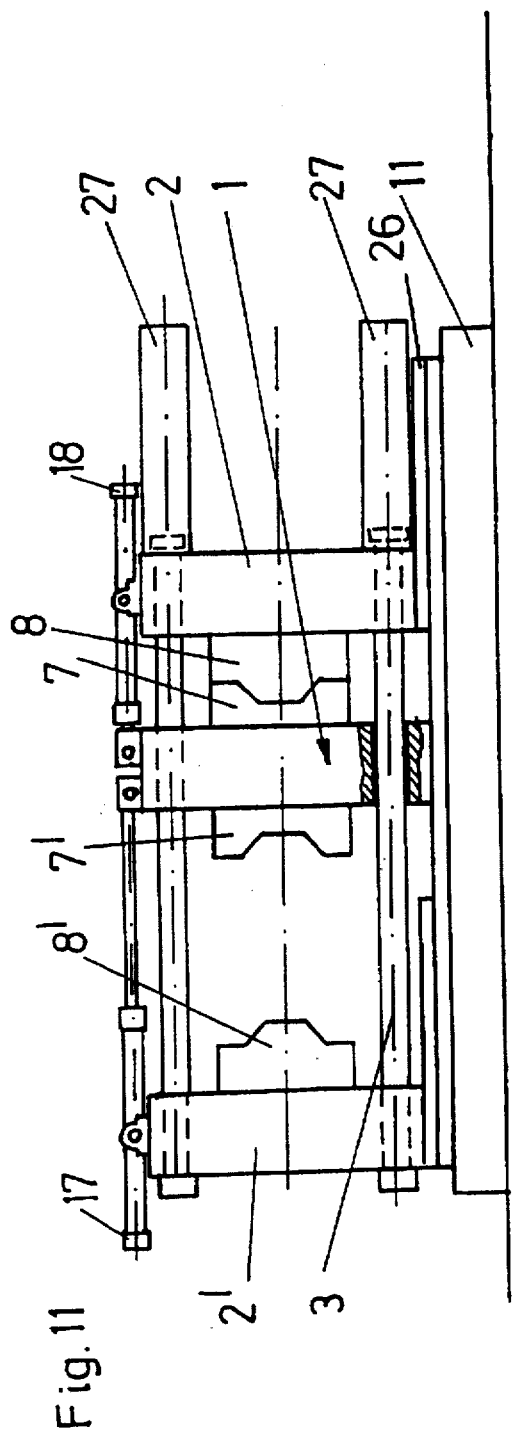

DOUBLE CLOSING UNIT FOR AN INJECTION MOULDING MACHINE

FIELD AND BACKGROUND OF THE INVENTION

The invention relates to a double closing unit of an injection moulding machine with at least one injection assembly, a stationary mould mounting plate and two movable mould mounting plates which are connected by way of bar members, and with fast-motion cylinders and pressure cushion systems for building up the closing force, wherein the stationary mould mounting plate are arranged between the two movable mould mounting plates.

In conventional injection moulding machines there is only one closing system with a stationary and a movable mould mounting plate. Only one tool can be respectively held in position in an injection moulding machine of that kind. For reasons of economy attempts have been made to design closing systems in which two tools can be mounted, which tools can be filled with plasticised plastic material either simultaneously or alternately.

An injection moulding machine of that kind is described in EP-A1-0 068 596. In the case of that closing unit the stationary mould mounting plate is arranged at the end and there is only one hydraulic system for building up the pressure. That arrangement involves a mutual dependency in respect of the production procedure in the two moulding tools. The distributor system for the plasticised plastic material is disposed at one of the movable mould mounting plates which as a result is of a very large mass. The relationship with the injection unit is interrupted in each movement operation.

French patent specification No 1 304 803 discloses a closing unit with a central stationary mould plate and two movable mould mounting plates which are arranged at the two sides of the stationary mould plate. That arrangement has two further outer end plates against which the hydraulic cylinders which act on the movable mould mounting plates are supported. Consequently a closing unit of that kind has a total of five plates. DE-Al-33 00 652 discloses a closing unit with a central stationary mould mounting plate and two movable mould mounting plates, the two mould mounting plates being moved by way of high-pressure advance means. The high-pressure advance means bears against an additional end plate. That injection moulding machine therefore has a total of four plates and is therefore still relatively expensive.

SUMMARY OF THE INVENTION

The object of the present is to be provide a double closing unit for an injection moulding machine, which is distinguished by being of a particularly economical design configuration.

In accordance with the invention that object is attained in that the closing unit is designed without end plates and there are only the three mould mounting plates and that the pressure cushion systems and/or the fast-motion cylinders are supported at the stationary mould mounting plate.

The configuration according to the invention of the closing unit, wherein the pressure cushion systems or the fast-motion cylinders are supported at the stationary mould mounting plate, means that it is possible to omit a further end plate. The closing unit has only the three mould mounting plates which are absolutely necessary so that two moulding tools can be arranged simultaneously in the injection moulding machine, with a minimum in terms of structural expenditure.

Various embodiments of the invention are described in greater detail hereinafter with reference to the figures of the accompanying drawings.

DESCRIPTION OF THE PREFERRED EMBODIMENTS

Figure 1:
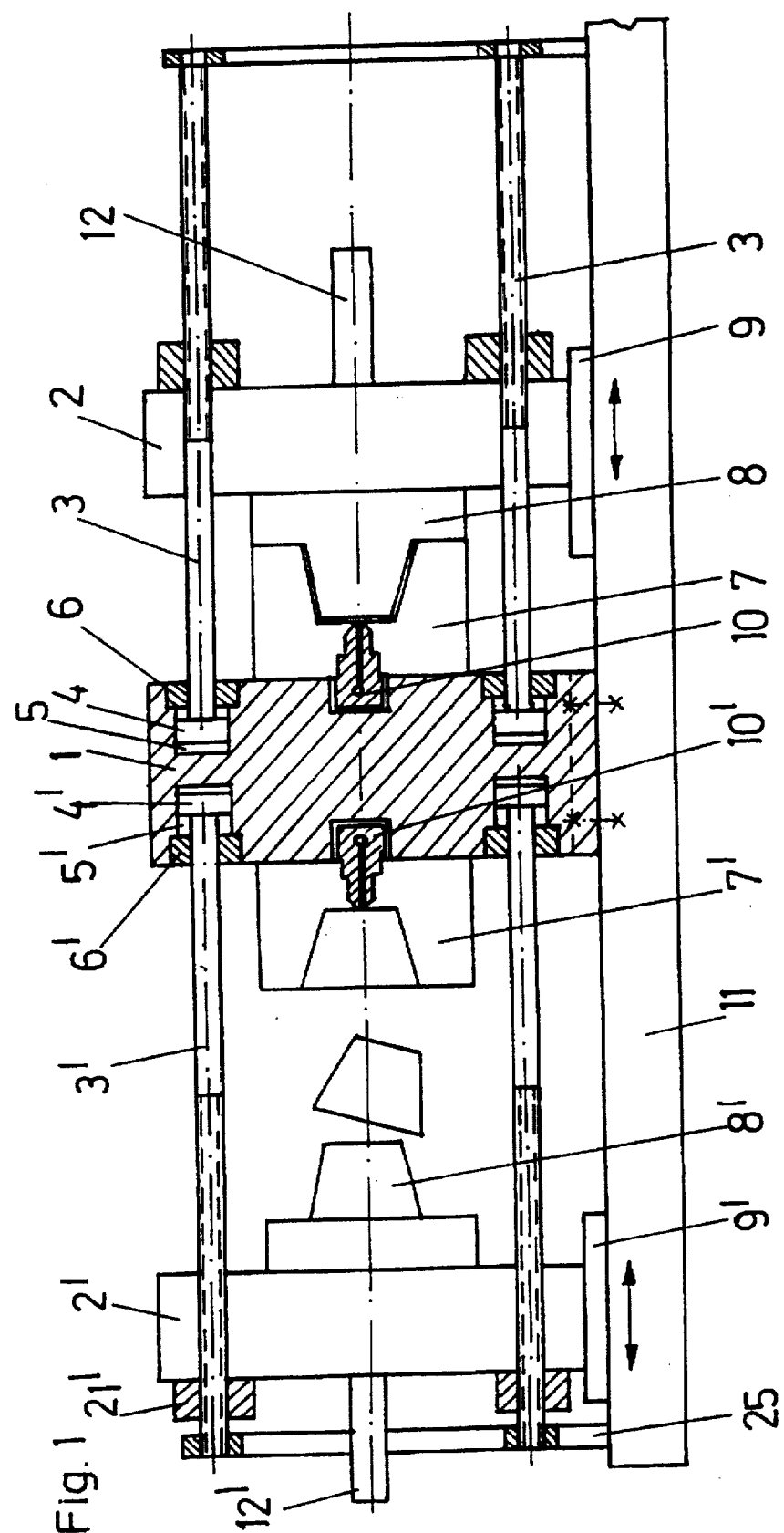
FIG. 1 is a diagrammatic view of an embodiment, wherein one tool is closed and one tool is open.

The middle stationary mould mounting plate 1 is rigidly connected to the machine frame 11. The movable mould mounting plates 2, 2' are supported by way of slide shoes 9, 9' on the machine frame 11 and are moved by fast-motion cylinders 17, 19 and 18, 20 (the term fast-motion cylinder relates in each case to the respective piston-cylinder unit). The machine frame 11 is advantageously provided with rails 26 on which the slide shoes 9 are movable.

When the tool halves 7, 8 are closed the divided locking jaws 21, 22 are moved in by the locking cylinders 23, 24 and 23', 24' respectively and engage into peripherally extending grooves on the bar members 3, 3'.

When a pressure is built up on the rod side in the cylinder 5, 5' of the pressure cushion, the closing force is built up by way of the piston 4, 4', the bar members 3, 3', the locking jaws 21, 22 and 21', 22' respectively and the movable mould mounting plate 2, 2'. The cylinders 5, 5' with their respective pistons 4, 4' from a pair of pressure cushion systems.

Figure 2:
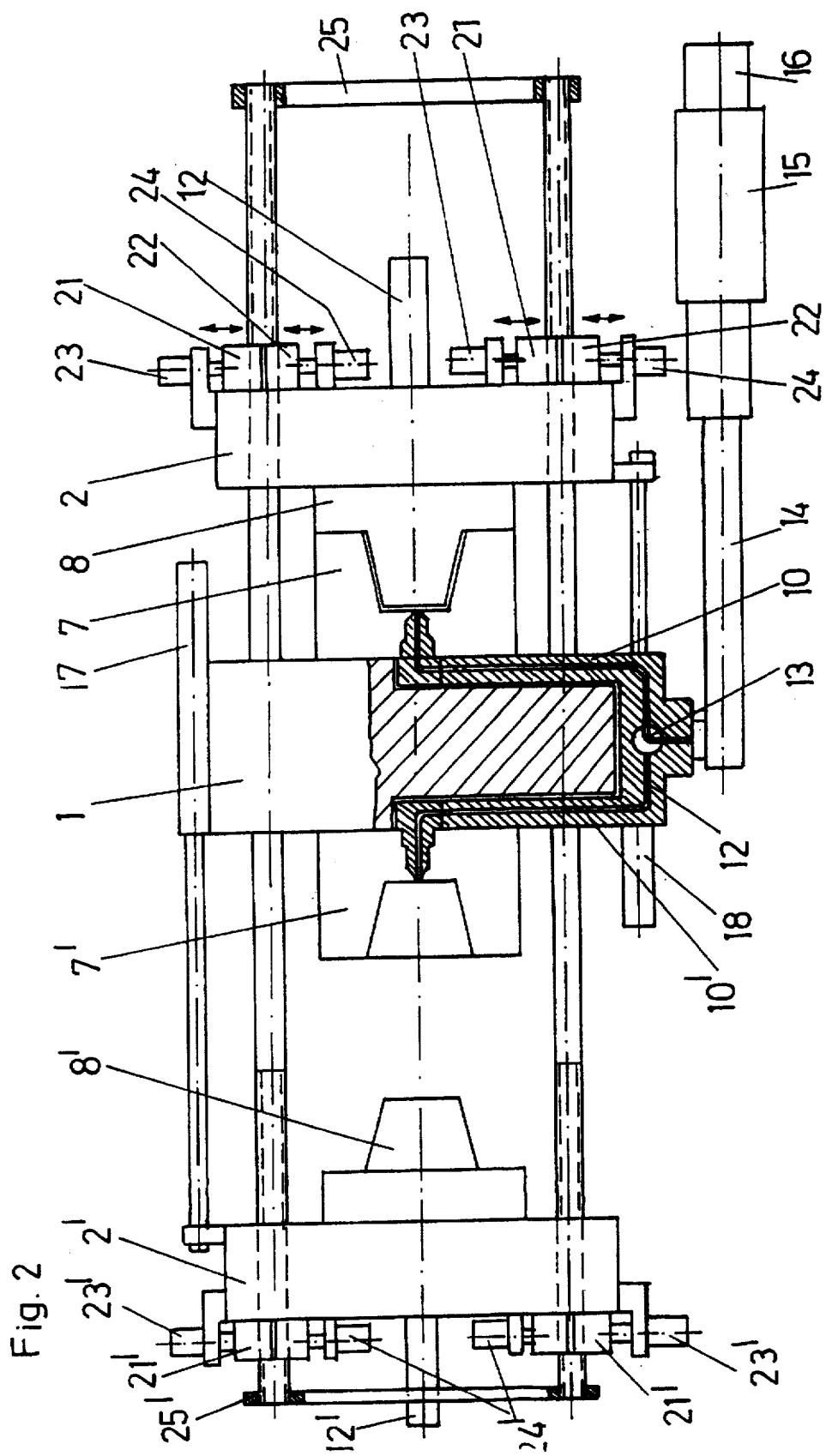
FIG. 2 is a plan view of that closing unit with the distribution system for the plasticised plastic material and the locking mechanism.

With the injection unit consisting of a mass cylinder 14, an injection cylinder 15 and a drive motor 16 plasticised plastic material is injected by way of the distributor system 12, 10, 10' into the tool 7, 8 and 7', 8' respectively. The flow of material is diverted by way of the distributor switching valve 13 in the embodiment shown in FIG. 2. In the case of an injection assembly of that kind, the distributor switching valve 13 must be changed for the simultaneous injection of plastic material into both tools.

For the purposes of opening the tools 7, 8 and 7', 8' respectively the locking jaws 21, 22 and 21', 22' respectively are moved out by the locking cylinders 23, 24 and 23', 24' respectively and the movable mould mounting plate 2, 2' is displaced by the fast-motion cylinders 18, 20 and 17, 19.

The moulding can be removed from the mould by the ejector cylinder 12, 12'.

The fast-motion cylinders 18, 20 and 17, 19 are arranged diagonally in relation to each movable mould mounting plate. The bar members 3, 3' are held in position with spacer plates 25, 25'.

The cylinders 5, 5' of the pressure cushions are closed on the bar member side by bushes 6, 6'.

Figure 3:
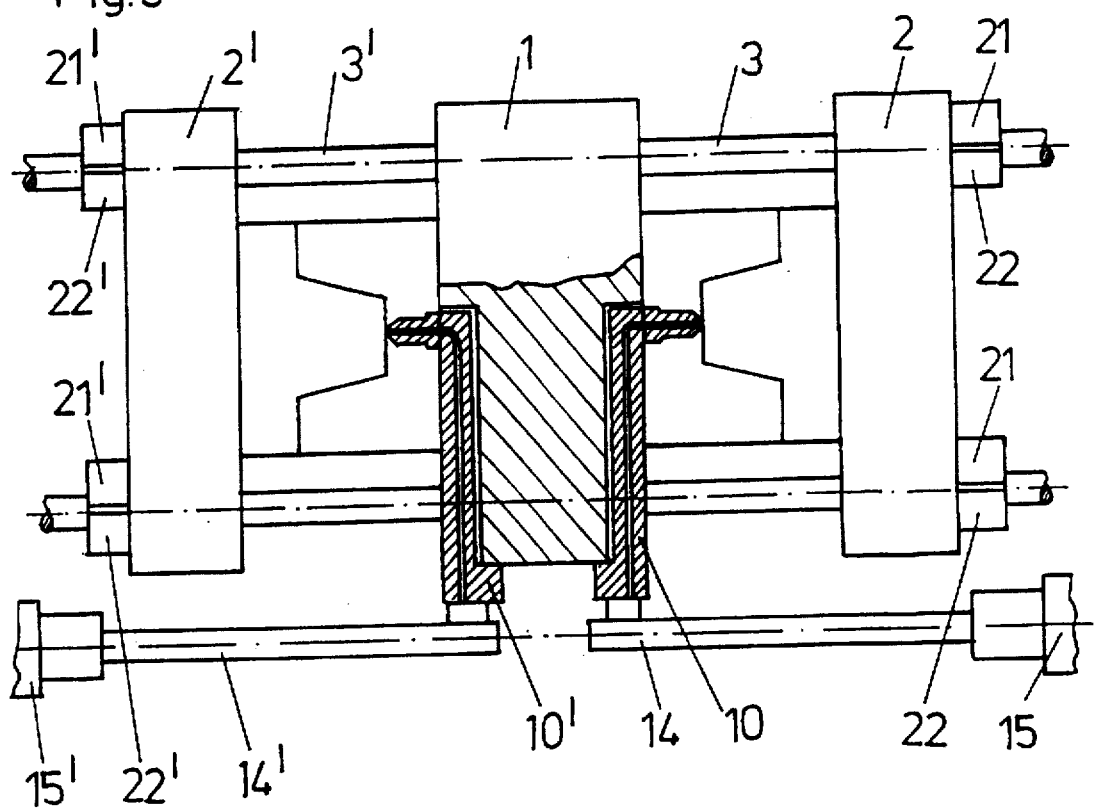
FIG. 3 shows an embodiment with two injection assemblies.
Figure 4:
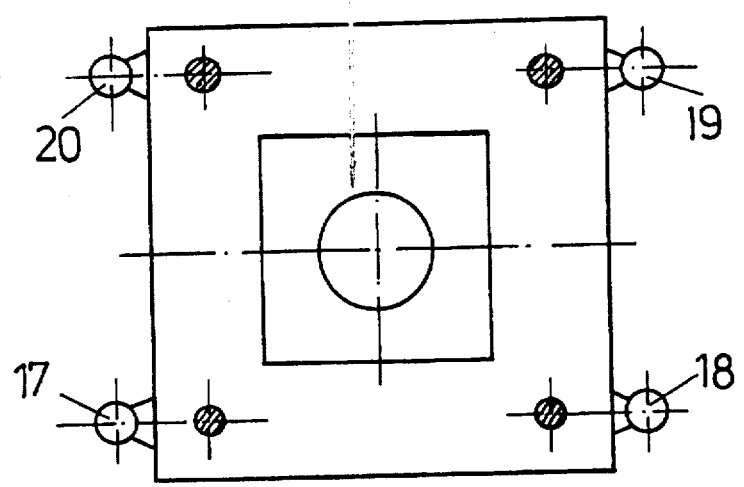
FIG. 4 shows the arrangement of the fast-motion cylinders, FIG. 5 diagrmmatically shows a view partly in section through a further embodiment of a closing unit according to the invention, one tool being closed and one tool open.
Figure 5:
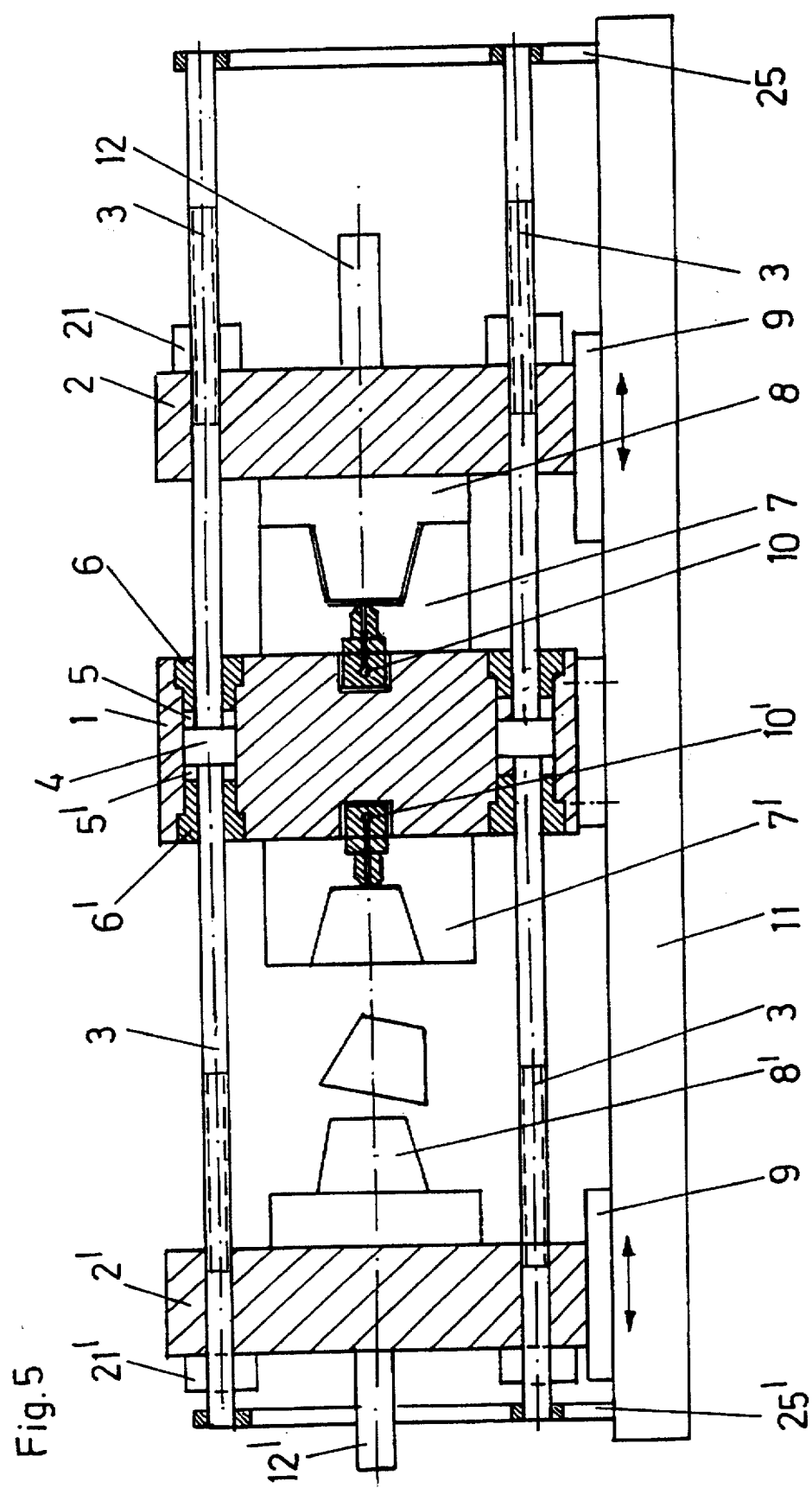
Figure 6:
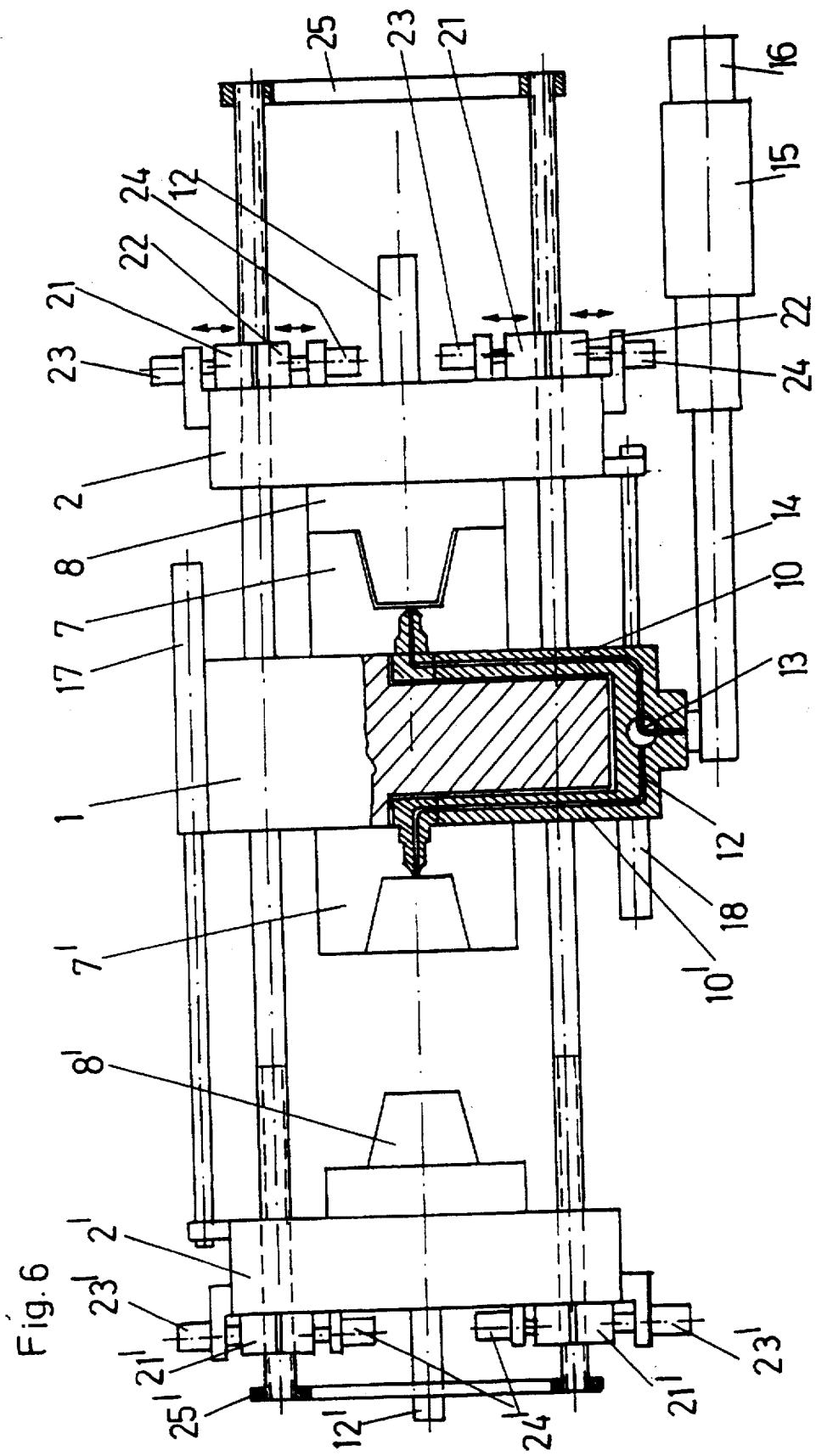
FIG. 6 is a plan view partly in section of the middle mould mounting plate.
Figure 7:
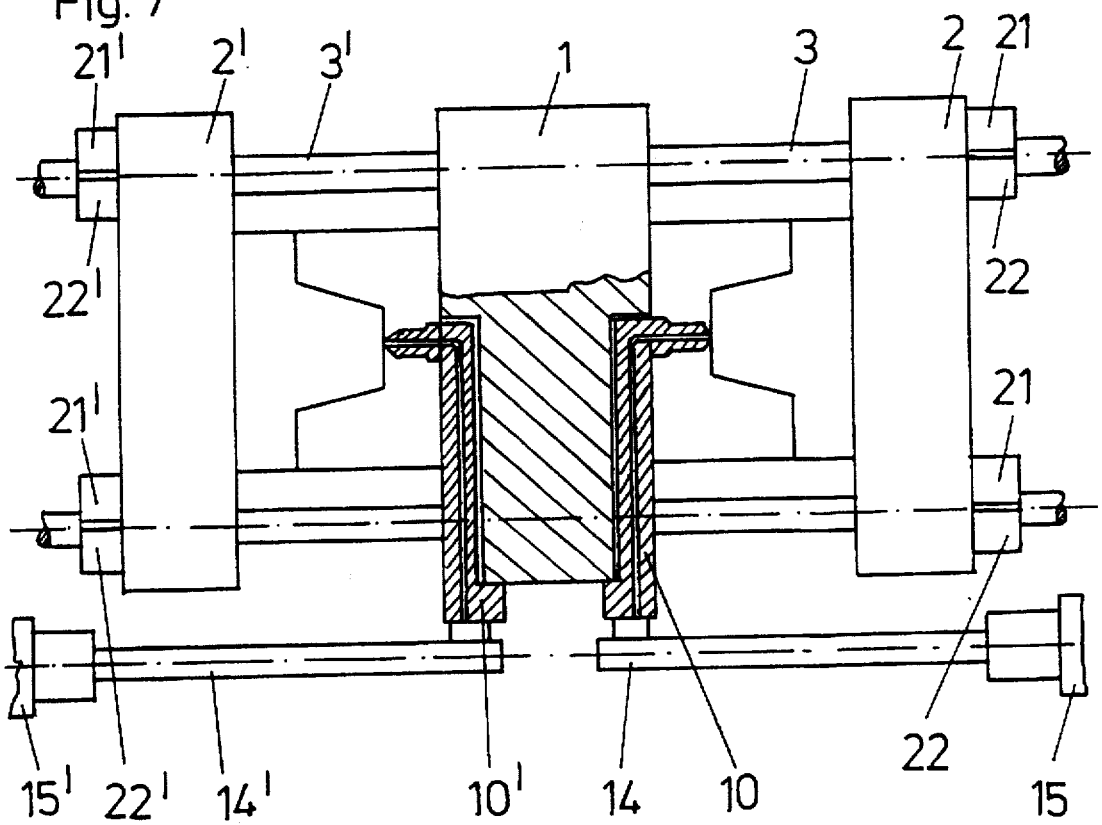
FIG. 7 is a partly sectional plan view of a closing unit with two injection assemblies.
Figure 8:
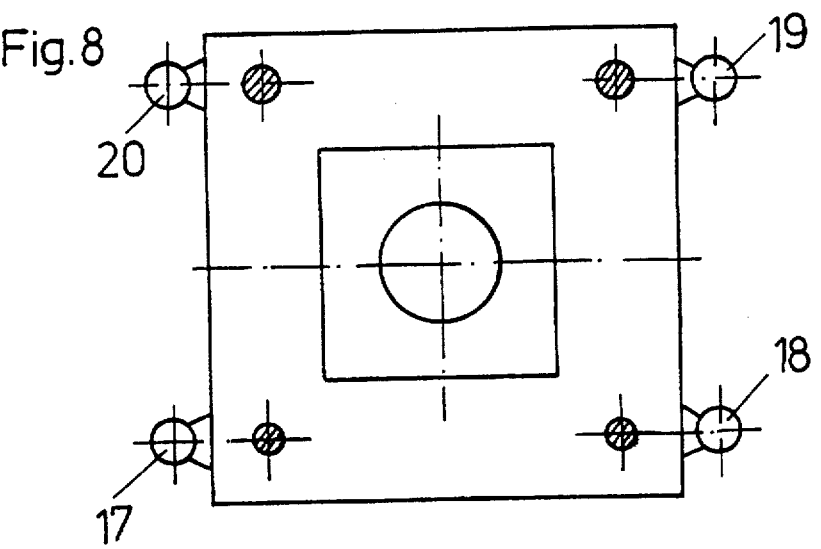
FIG. 8 shows an end view of a mould mounting plate, FIG. 9 diagrammatically shows the procedural cycle in the two moulds, FIGS. 10 and 11 each show diagrammatic side views of a further embodiment of a closing unit according to the invention, one mould being shown closed and one mould being shown open in each case.

In many cases it may be desirable to arrange two separate injection assemblies 14, 15, 16 and 14', 15', 16' respectively, as shown in FIG. 3.

In an embodiment of that kind of a double closing unit, it is possible to provide for the independent production of mouldings with the tools 7, 8 and 7', 8'. The injection moulding machine can be adapted to the respective production conditions in the optimum fashion.

In the embodiments shown in FIGS. 5 through 9 the middle mould mounting plate 1 is again rigidly connected to the machine frame 11. The movable mould mounting plates 2, 2' are again supported on the machine frame 11 by way of slide shoes 9, 9' and are moved by the fast-motion cylinders 18, 20. When the mould halves 7, 8 are closed, the locking jaws are closed by the locking cylinders 23, 24 and come into engagement by way of peripherally extending grooves on the bar members 3.

When a pressure is built up in the pressure cushions on one side of the piston 4 in the cylinder 5, 5', the closing force is built up by way of the piston 4, the bar members 3, the locking jaws 21, 22 and the movable mould mounting plate 2, 2'.

With a closing unit in accordance with the embodiment shown in FIGS. 5 through 9 the pressure can be built up in each case only at one side of the stationary mould mounting plate 1.

With the injection unit consisting of the mass cylinder 14, an injection cylinder 15 and a drive motor 16, plasticised plastic material is injected into the respective tool 7, 8 by way of the distributor system 10.

During the injection operation and the subsequent cooling-down time for the tool 7, 8, the tool 7', 8' is opened. The locking jaws 21', 22' are opened and the movable mould mounting plate 2' is moved out by the fast-motion cylinders 17, 19.

During that time the hydraulic pressure is reduced in the cylinder 5'. After opening of the tool 7', 8' the injection moulding is removed from the mould with the ejector cylinder 12' and the movable mould mounting plate 2' is closed again by means of the fast-motion cylinders 17, 19. The plastic material which has been pre-metered in the mass cylinder 14 can now be injected into the tool 7', 8' and the cooling time for the injection moulding begins in the tool 7', 8'.

When cooling in the tool 7, 8 is concluded, the tool 7, 8 can be opened and the operating procedure repeated at the other side of the stationary mould mounting plate 1. The procedural cycle for the two tools 7, 8 and 7', 8' is shown in FIG. 9.

Figure 12:
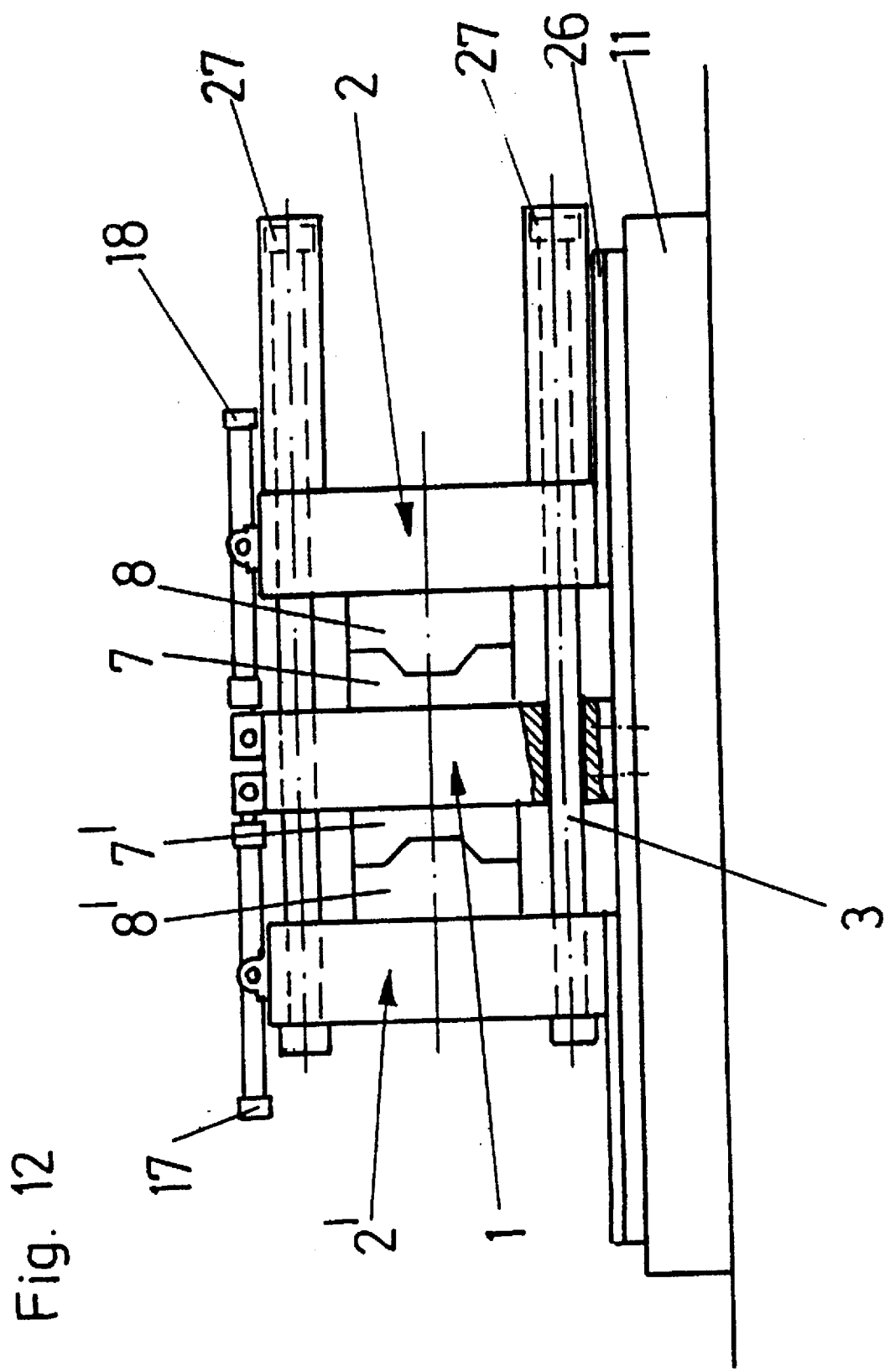
FIG. 12 shows a side view of this embodiment, with both moulds closed.

In the embodiment shown in FIGS. 10 through 12 the middle stationary mould mounting plate 1 is again rigidly connected to the machine frame 11 while the two movable mould mounting plates 2, 2' are movable on rails 26. This closing unit permits three different positions in respect of the movable mould mounting plates 2, 2'. Either the left-hand mould tool 7', 8' is closed, as shown in FIG. 10, and the right-hand mould tool 7, 8 is open, or vice-versa, or both mould tools 7, 8, 7', 8' are closed.

While one mould tool, for example the tool 7, 8 is open, the other mould tool 7', 8' is held by means of the fast-motion cylinders 17, 19 in the closed position, so that there is no need for a specific locking mechanism. The force of the fast-motion cylinders 17, 18, 19, 20 for holding the assembly closed must therefore be greater than the opening force of the fast-motion cylinders 17, 18, 19, 20.

In the embodiment shown in FIGS. 10, 11 and 12 the pressure cushion cylinders 27 are arranged at the movable mould mounting plate 2 and the two mould mounting plates 2, 2' are connected by way of the bar members 3.

I claim:

1. A double closing unit of an injection molding machine, comprising:

a pair of movable mold mounting plates;

a stationary mold mounting plate having a pair of stationary mold faces, aligned between the pair of movable mold mounting plates;

two pairs of bar members;

a pair of locking units, each locking unit for coupling one of the pair of movable mold mounting plates to one of the pairs of bar members;

a pair of pressure cushion systems located in the stationary mold mounting plate, each pressure cushion system connected with one of the pair of movable mold mounting plates through one of the pairs of bar members, the pair of pressure cushion systems being independent of each other; and at least one pair of fast-motion cylinders connected respectively between each movable mold mounting plate and the stationary mold mounting plate for moving the movable mold mounting plates.

2. A double closing unit according to claim 1, wherein each of the pair of pressure cushion systems comprises at least one pair of pistons slidably connected within at least one pair of cylinders, the pistons and cylinders disposed within the stationary mold mounting plate, and the double closing unit further comprising a distributor system having at least a pair of injection nozzles located within the stationary mold mounting plate.

3. A double closing unit according to claim 2, wherein the injection nozzles are arranged at least one injection nozzle at each face of the stationary mold mounting plate, and the distribution system has at least one injection assembly docked adjacent the stationary mold mounting plate.

4. A double closing unit according to claim 3, wherein the at least one injection assembly is in constant communication with the distribution assembly.

5. A double closing unit according to claim 4, further comprising a machine frame, a pair of rails on the machine frame, the stationary mold mounting plate rigidly connected to the pair of rails, and each of the movable mold mounting plates movably connected to pair of the rails.

6. A double closing unit according to claim 1, wherein the pair of pressure cushion systems comprise pressure cushion cylinders mounted on one of the pair of movable mold mounting plates.

7. A double closing unit according to claim 1, wherein each of the locking units comprises at least one locking jaw for selectively locking the movable mold mounting plates to the bar members.

8. A double closing unit according to claim 1, further comprising a pair of injection passages located within the stationary mold mounting plate; a pair of injection nozzles oriented on opposite faces of the stationary mold mounting plate, each nozzles connected to one injection passage; a plasticizer cylinder; a distributor switching valve connecting the pair of injection passages to the plasticizer cylinder.

* * * * *